United States Patent [19]
Shepard

[11] Patent Number: 5,837,990
[45] Date of Patent: Nov. 17, 1998

[54] PORTABLE OPTICAL SCANNING SYSTEM INCLUDING RING AND TRACK

[75] Inventor: Howard Shepard, Great River, N.Y.

[73] Assignee: Symbol Technologies, Inc., Holtsville, N.Y.

[21] Appl. No.: 755,983

[22] Filed: Nov. 25, 1996

[51] Int. Cl.[6] .................................................. G06K 7/10
[52] U.S. Cl. ................................. 235/472; 235/383
[58] Field of Search ................................. 235/472, 383

[56] References Cited

U.S. PATENT DOCUMENTS 4,706,096  11/1987  Sato ........................................ 235/472

*Primary Examiner*—Harold Pitts
*Attorney, Agent, or Firm*—Kirschstein, et al.

[57] ABSTRACT

A portable optical scanner comprises a scanner element arranged to be supported on a user's finger for pointing at indicia to be read and a wrist unit provided on the user's wrist connected to the scanner element to provide power and data exchange. A track is provided secured at one end to the user's finger and running as far as the wrist unit. The scanner element is supported on the track and moveable along the track from a position at the user's finger for pointing/scanning and a retracted position adjacent the wrist unit if the user desires to use his hand so that the scanner does not provide an obstacle or impediment to such use.

17 Claims, 4 Drawing Sheets

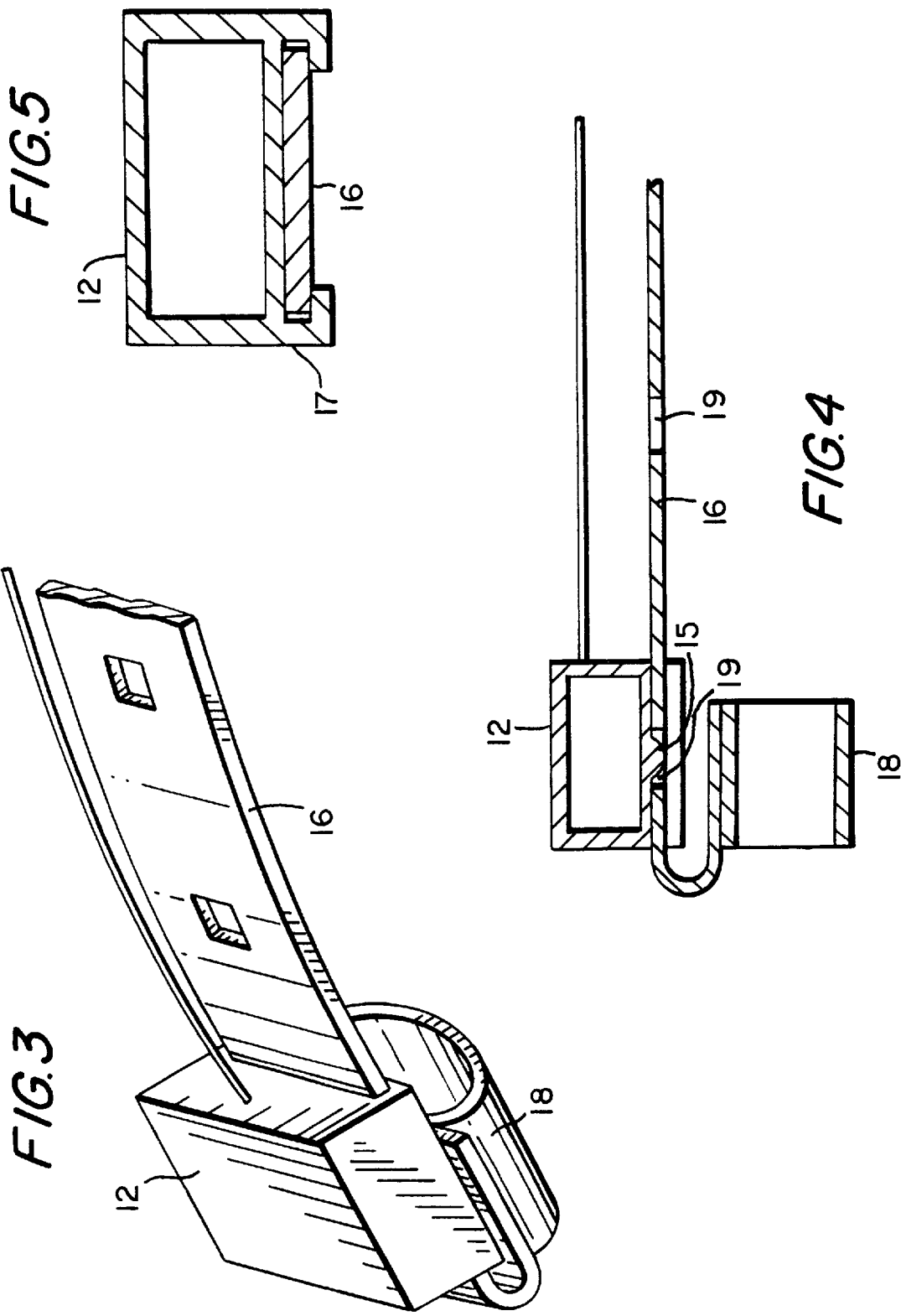

PORTABLE OPTICAL SCANNING SYSTEM INCLUDING RING AND TRACK

BACKGROUND OF THE INVENTION

CROSS REFERENCE TO RELATED APPLICATIONS

This application is related to U.S. Ser. No. 08/502,966, filed Jul. 17, 1995, now allowed; and U.S. Ser. No. 08/637, 011, filed Apr. 24, 1996, which is a continuation of Ser. No. 08/294,845, filed Aug. 19, 1994, now abandoned, which was a continuation-in-part of U.S. Ser. No. 08/068,025, filed May 28, 1993, now pending.

This application is also related to U.S. Ser. No. 08/228, 172, filed Apr. 15, 1994, now U.S. Pat. No. 5,543,610; which was a continuation of U.S. Ser. No. 07/884,734, filed May 15, 1992, now abandoned.

This application is also related to copending U.S. Ser. No. 08/416,128, filed Apr. 3, 1995, now U.S. Pat. No. 5,578,810, which was a continuation of application U.S. Ser. No. 08/246,382, filed May 20, 1994, now U.S. Pat. No. 5,410, 140, which is a continuation of U.S. Ser. No. 08/073,995, filed Jun. 9, 1993, now abandoned, which is a continuation of U.S. Ser. No. 07/787,458, filed Nov. 4, 1991, now abandoned, which is hereby incorporated by reference.

1. Field of the Invention

The invention relates to a portable optical scanner for reading indicia of varying light intensity, and in particular to such scanners which are adapted to be worn on the person of a user.

2. Description of the Related Art

Various optical readers and optical scanning systems have been developed heretofore for reading indicia such as bar code symbols appearing on the label or on the surface of an article. The symbol itself is a coded pattern of indicia comprised of, for example, a series of bars of various widths spaced apart from one another to bound spaces of various widths, the bars and spaces having different light reflecting characteristics. The readers in scanning systems electro-optically transform the graphic indicia into electrical signals, which are decoded into alphanumeric characters that are intended to be descriptive of the article or some characteristic thereof. Such characteristics are typically represented in digital form and utilized as an input to a data processing system for applications in point-of-sale processing, inventory control and the like. Scanning systems of this general type have been disclosed, for example, in U.S. Pat. Nos. 4,251,798; 4,369,361; 4,387,297; 4,409,470; 4,760,248; 4,896,026, all of which have been assigned to the same assignee as the instant application. As disclosed in the above patents, one embodiment of such scanning systems includes, inter alia, a hand held, portable laser scanning device supported by a user, which is configured to allow the user to aim the scanning head of the device, and more particularly, a light beam, at the targeted symbol to be read.

Such prior art hand held devices generally incorporate a light-receiving module which receives the light that has been reflected from the bar code symbol and determines, from the reflected pattern, the sequences of bars and spaces within the symbol. The unit may also incorporate decoding circuitry to decode the received information and to recover the underlying data (for example the alphanumeric data) which the bar code symbol represents.

It has previously been proposed to provide a small portable scanner attached to a ring which is worn on a finger of the user. To operate the scanner, the user merely points the appropriate finger in the direction required so that the scanning beam scans across the indicia to be read. One difficulty with such an arrangement is that where the operator is engaged in a variety of tasks, only one of which is the scanning of bar codes, it may be inconvenient for the ring repeatedly to have to be put on and taken off again. Also, if the user accidentally knocks the scanner module, or twists it, the ring and/or module might be damaged. Furthermore it is desirable to be able to position the scanner to point in a desired direction. It is also desirable to be able to retract the scanner into a retracted position, for example when the operator is moving or lifting objects, or accessing restricted areas such as the user's pockets.

OBJECTS OF THE INVENTION

It is an object of the invention at least to alleviate the problems of the prior art.

It is a further object of the invention to provide a convenient to use portable optical scanner.

It is yet a further object to provide a ring type optical scanner suitable for use where the operator has to access restricted areas manually.

SUMMARY OF THE INVENTION

According to the invention there is provided a portable optical reader comprising a reader element and a reader element guide arranged to be supported on person of a user, the reader element being mounted on the guide for movement thereon relative to the person of the user. Accordingly the reader element can be moved along the guide to a retracted position if it is desired for access manually a physically restricted area.

The guide may be arranged to be supported on a user's hand. For example the guide may be arranged to be secured between a users finger and a user's wrist. The portable optical reader may comprise a control unit for powering, and data exchange with, the reader element, the control unit being arranged to be secured to the user's wrist. The control unit may power and exchange data with the reader element via cable means or via a communication line provided in the guide.

The reader element guide may comprise a track. The reader element may be arranged to slide along the track. The reader element may be mounted against a mounting face of the track and include retaining elements extending partially around the opposing face of the track. The reader element may be mounted on rollers on the track for rolling movement.

Detent means may be provided on the reader element and cooperating detent means located at one or more positions along the guide for releasably retaining the reader element at said one or more positions.

The reader and guide may be arranged to be supported on a garment for a user. The garment may be a hat. The reader element guide may be arranged to be supported in the chest region of the garment.

According to the invention there is further provided a portable optical reader comprising a reader element and a reader element guide arranged to be mounted on the hand of a user extending substantially from the finger to the wrist, the reader element being mounted on the guide and movable thereon long.

The portable optical reader may further comprise a control unit mounted at the user's wrist and arranged to communicate with the reader element to power the reader element and for data exchange. The reader element may be arranged to slip along the guide on contact with an external obstacle.

DESCRIPTION OF THE PREFERRED EMBODIMENT

The invention may be carried into practice in a number of ways and several specific embodiments will now be described, by way of example, with reference to the accompanying drawings, in which:

FIG. 3 shows a detail of the present invention illustrating a scanner element and track;

FIG. 4 is a sectional side view of the detail shown in FIG. 3;

FIG. 5 is a front sectional view of the embodiment of FIG. 4;

Figure 1:
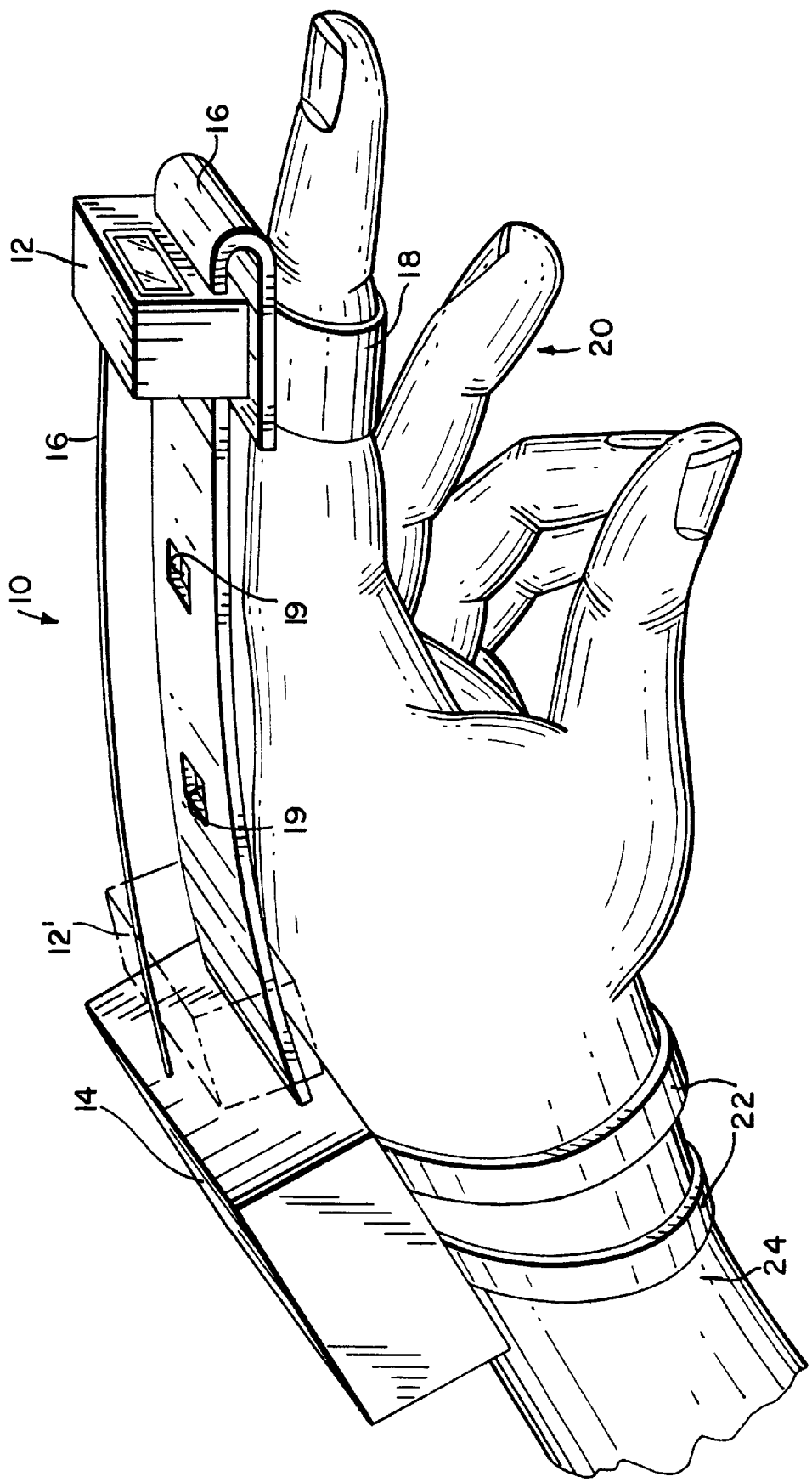
FIG. 1 shows a hand mounted portable scanner according to the present invention.

One embodiment of the system according to the present invention is shown in FIG. 1. The system, designated generally as 10 includes a scanner element 12 (for example of the type sold under the trade mark SATURN by the assignees of the present invention), a wrist mounted unit 14, a track 16, a ring 18 by virtue of which one end of the track is mounted on the user's hand 20, and one or more wrist bands 22 by virtue of which the wrist mounted unit is mounted to the user's wrist 24, the other end of the track 16 being secured to the wrist-mounted unit 14.

Figure 2:
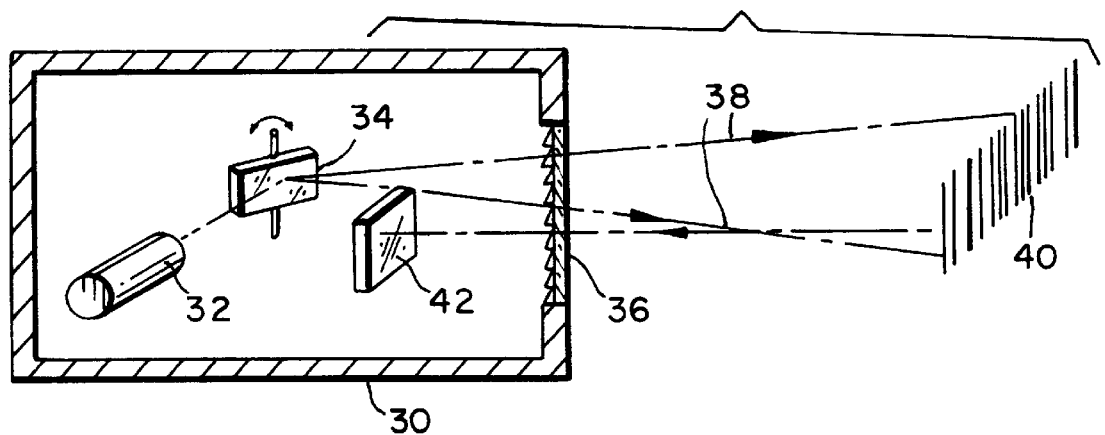
FIG. 2 shows schematically the components found in a scanner element.

The scanner element may be of any known type comprising, as shown in FIG. 2, a housing 30, a reading beam generating means such as a laser diode 32, laser beam scanning means such as a scanning mirror 34 and a scanning window 36. In use the reading beam scanned by the scanning mirror 34 is shown as 38 and is reflected off a printed indicia such as a bar code symbol 40. The reflected beam is received by a detector 42. Instead of the flying spot scanning arrangement shown, a field of view type arrangement including a CCD (Charge Couple Device) detector can be incorporated. Various arrangements have been contemplated for mounting such a system but it will be appreciated that one desirable arrangement is to have the scanner element 12 mounted on the user's finger allowing the user to direct the scanning beam using a natural pointing action. The scanner element 12 is preferably mounted by means of a ring-type mount 18 although it would be appreciated that the ring-type mount, although shown wholly encircling the user's finger could be any suitable type of mount, for example a clip enclosing part but not all of the finger.

Where the scanner element 12 is mounted on the user's finger, it is desirable to reduce the weight of the scanner element 12 as much as possible in order to reduce user fatigue correspondingly. This can be done, for example, by ensuring that the components in the scanner element 12 are as small and light-weight as possible. The weight can further be reduced by ensuring that only the minimum number of vital components are found in the scanner element 12 itself, in particular light generating in the receiving means. Other components such as a power module and processing elements which can be of known type are in fact mounted in the present embodiment in the wrist unit 14 which is connected to the scanner element 12 by a cable 26 or other suitable means.

Control information can be communicated to the scanner element 12 from the wrist mounted unit 14 via the cable 26, and the data read by the scanning element 12 is returned to the wrist unit 14 also via the cable 26.

A problem that has arisen in previous ring mounted scanner systems has been where the user wishes to use his hand for other purposes such as lifting or accessing restricted areas. It would be appreciated that this will occur often, for example, in inventorying or point of sale applications where such a scanner system may often be used. Static ring mounted scanners could easily impede user motion, or become caught on objects, or prevent the user from accessing restricted areas for example between crates or even the user's own pocket. One successful solution has been to provide a "Break-Away" ring (see co-pending U.S. application Ser. No. 08/502,966, filed Jul. 17, 1995, now allowed. In that system, the assembly includes a ring for mounting the scanner element and a detachable scanner element. Whilst the system has proved very satisfactory, the present invention envisages yet further improvements.

In particular the present invention provides a track-type arrangement 16 on which the scanner element 12 is slidably mounted. The track 16 extends from the wrist unit 14 to the ring 18 allowing the scanner element to be positioned at the user's finger for optimum pointing or slid back along the track 16 to a position abutting or adjacent the wrist unit 14 or at least so far as to not impede hand use. A particular advantage of such a system is that the scanner element 12 is not removed altogether but can be simply retained in a different position, avoiding the risk of losing the scanner element 12 altogether were it detached. An additional advantage of the track 16 is that it can enhance the support given to the user's finger reducing fatigue associated with carrying the weight of the scanner element 12. The scanner is shown retracted in dotting lines at 12'.

The scanner element 12 and track 16 are shown in more detail in FIGS. 3 and 4. The track 16 is made of a flat ribbon of semi-flexible material. Any suitable material can be used, for example a metallic material or a plastics material. The flexibility of the material can be selected taking into account the extent to which the user may wish to bend his finger or curl his hand into a fist or, on the other hand, the amount of support that is required from the track 16 for the scanner element 12. A typical length for the track 16 may be in the region of 6 to 8 inches (150 to 200 mm) dependent principally on the desired location of the wrist unit 14. The width of the track 16 may be approximately 1–4½ inches (25 to 40 mm) depending on the dimensions of the scanner element 12.

As can be seen in FIG. 3, the scanner element is configured to be slidably retained on the track 16. In particular the scanner element 12 is of slightly greater width than the track 16 and includes a downwardly depending grip extending partially around the underside of the track 16. As a result the scanner element can slide freely along the track 16 but is retained in position against the track 16. FIG. 5 is a cross-sectional view showing the scanner 12 mounted on the track 16 via gripping projections 17 passing around the sides and partially along the underside of the track 16.

The track 16 is mounted on the ring 18 by any suitable means, for example adhesion, riveting or other forms of bonding. The ring 18 may be of the same material as the track or a suitable material for user comfort having, if desired, hypoallergenic properties. For example plastics material can be used. In order for the scanner element 12 to slide along the track 16 whilst clearing the user's hand and associated obstacles, the track 16 is raised slightly above the level of the users hand. This can be achieved, for example, for doubling over the track 16 at the forward, ring end such that it effectively forms a J shaped and bonding the shorter leg of the J shape to the ring 18. As a result the scanner element 12 can slide along the track spaced from the user's hand. Doubling over of the track 16 also provides a suitable stop such that the scanner element 12 is limited as to its forward most extent to the desired position on the user's finger for pointing.

In order for the scanner 12 to be retained in the desired position a detent 15 is provided projecting from the underside of the scanner element 12 which is retained in a corresponding aperture 19 in the track 16. The track 16 and the detent 16 can be made of suitable resilient material such that when a predetermined pressure is applied they are deformed suitably for the scanner 12 and detent 15 to be moved out of engagement with a given aperture 19 and slid along the track 16. Alternatively the detent 15 can be spring mounted or otherwise biased into engagement with the aperture 19. In order to facilitate sliding the track 16 or those portions of the scanner element 12 which contact the track 16 can be coated with a suitable friction reducing material such as Teflon (a registered trademark). The detent can be designed to move only on a predetermined pressure applied by the user, or such that the scanner element 12 automatically slides back if it is caught on a protuberance when the user is manually accessing a restricted area.

Although the track is shown on the user's forefinger it will be appreciated that it could be carried on any appropriate finger, for example the middle finger.

Figure 6:
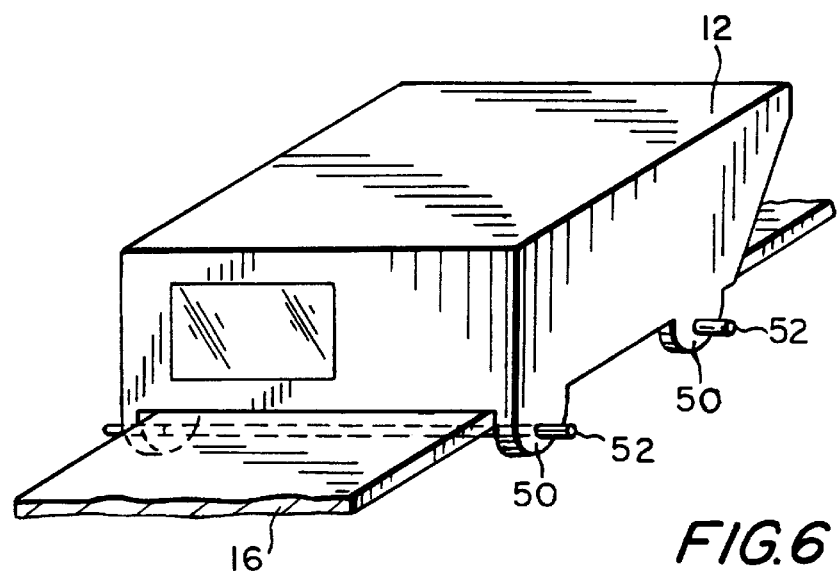
FIG. 6 shows schematically an alternative method of mounting a scanner element on a track.

It will be appreciated that the track type guide system discussed above comprises only one specific implementation of the invention. For example referring to FIG. 6 an alternative arrangement is shown in which a scanner element 12 slides along a track 16 being held against the track 15 by virtue of a pair of retaining pins 52 held against the underside of the track 16 by retaining lugs 50 depending from the scanner element 12. The pins are preferably arranged to roll to facilitate sliding. It that manner the scanner element 12 can very easily be moved along the track 16.

It will be appreciated that various alternative forms are contemplated. For example the scanner element 12 or a portion of the scanner element 12 can be held within a guide track on the upper surface of the track 16 as a result of which clearance between the track 16 and the user's hand will be required. The scanner element 12 can run on wheels in the guide track making it easier to move along the track 16. Indeed, if the power requirements were appropriate, a motor could be associated with the wheels allowing automatic driving of the scanner 12 until its desired position.

As mentioned above the scanner element 12 preferably includes a detent 15 for engaging with an aperture 19 in a track 16 to hold the scanner element 12 in a desired position. A plurality of such apertures 19 can be provided allowing the scanner element to be located in predetermined desired positions along the track 16. Alternative detent means than those discussed of any desired type can of course be incorporated instead. The scanner element 12 can be further mounted on the track 16 so as to allow it to be orientated to predetermined positions. For example the scanner element 12 can be added to the track 16 via a ball joint retained in a suitable guide channel allowing it to be slid along the track 16 twisted to point in any desired direction.

The illustrated embodiments show a cable 26 carrying power and data between wrist unit 14 and the scanner element 12. It will be appreciated that alternative configurations could be used; for example suitable lines could be provided integrally with the track 16 (and suitably insulated from the user's hand) cooperating with contacts provided on the scanner element 12.

As a result of the configuration of the invention, the scanner element 12 can be slid back along the track 16 out of the way such that the user can use his hand without impediment. The scanner element 12 can be retained in predetermined positions by means of a detent 15 or indeed can be arranged to resist a sliding of a scanner element until a predetermined manual pressure is exerted to move it. Because the scanner element 12 is free to move along the track it will be seen that when the user reaches his hand into an area of restricted access such as his pocket the scanner element 12 can be engaged by an element at the periphery of the aperture (for example the pocket lining) and pushed back automatically out of the way.

The specific embodiments described above are discussed with reference to a finger mounted scanner. It can be seen that the principle of the prevent invention can in fact be applied to a scanner mounted on any part of the body.

Figure 7:
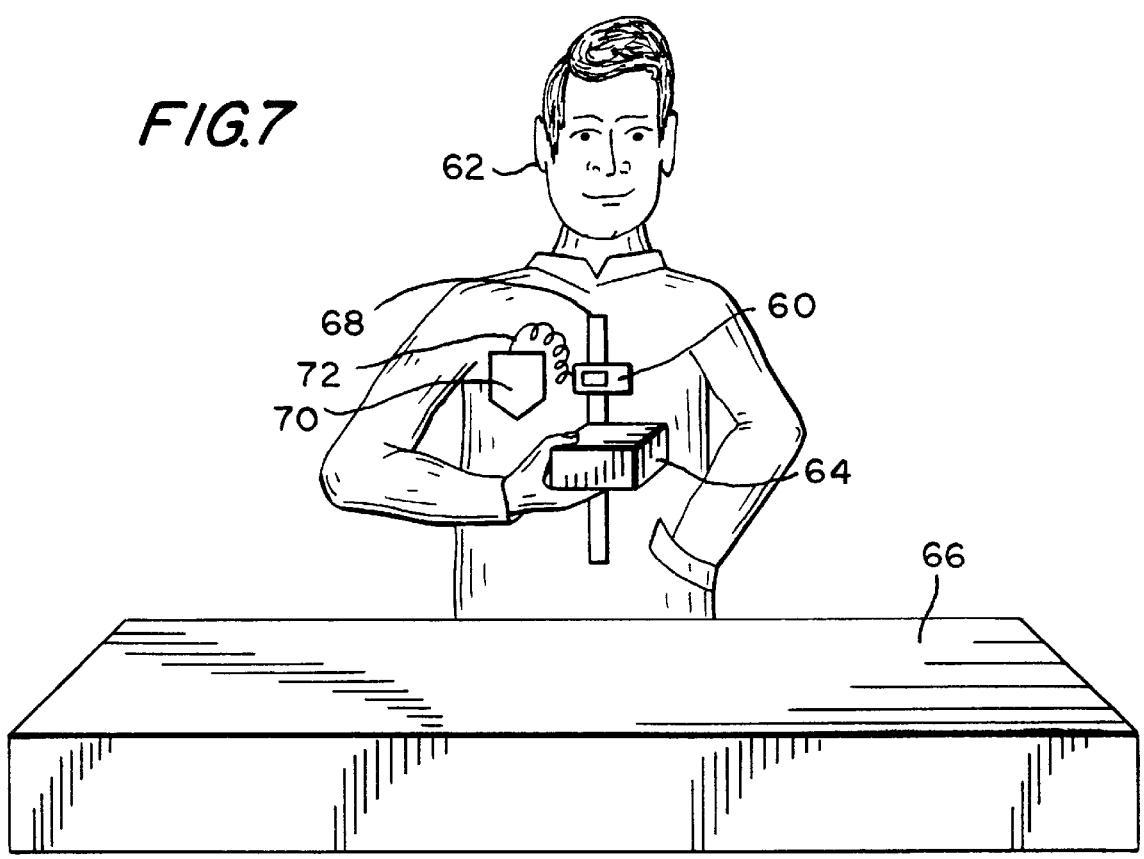
FIG. 7 shows a chest mounted scanner according to the present invention.
Figure 8:
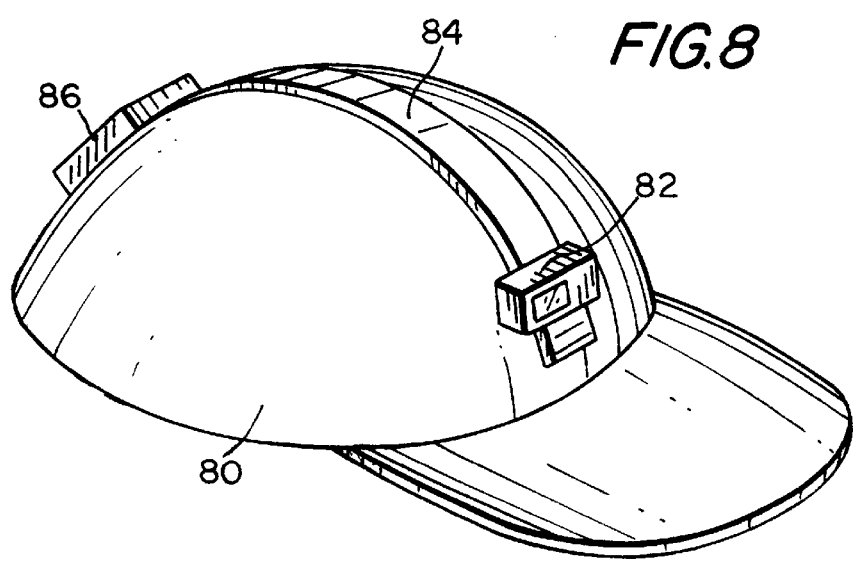
FIG. 8 shows a hat mounted scanner according to the present invention.

For example, as shown in FIG. 7, a chest mounted scanner 60 is shown. Such a scanner would be of assistance where the user 62 places an item 64 in front of his body for scanning. In certain circumstances defined for example by the nature of the goods, the height of any work surface 66 and the height of the user 62 himself, it might be desirable to mount the scanner element 60 at different heights. Accordingly a track of the type discussed above is provided at 68 along which the scanner element 60 can be moved to any desired height. Of course the track need not be configured vertically but could be, for example, diagonal or at any other suitable orientation allowing desired positioning of the scanner element 60. In one variation the equivalent to a wrist unit, a control unit, could be provided at one or other ends of the track 68 analogous to the finger mounted arrangement discussed above. In the arrangement shown, a control unit is in fact retained in a pocket 70 on the user's garment and is connected to the scanner 60 by a cable 72. (In a similar manner, the wrist unit could be replaced by a remote unit in the finger mounted configuration, the track being retained directly at the user's wrist by a band or other suitable means). The track 68 could alternatively be configured to allow a scanner element 60 to be retracted to a non-obstructing position, for example at the user's belt or around the side of the user. Various other possibilities would be apparent to the skilled person, one such being shown in FIG. 8 in which a hat 80 supports a scanner element 82 on a track 84. A control unit 86 is located at the rear of the hat. The scanner element 82 can be moved along the track 84 to any desired position dependant, for example, upon the height of items to be scanned.

Without further analysis, the foregoing will so fully reveal the gist of the present invention that others can readily adapt to various applications without omitting features that, of the standpoint of prior art, fairly constitute essential characteristics of the generic or specific aspects of the invention and, therefore, such adaptions should and are intended to be compounded within the meaning and range of equivalents of the following claims.

I claim:

1. A portable optical reader comprising a reader element and a reader element guide arranged to be supported on person of a user, the reader element being mounted on the guide for movement thereon relative to the person of the user.

2. A portable optical reader as claimed in claim 1 in which the guide is arranged to be supported on a users hand.

3. A portal optical reader as claimed in claim 2 in which the guide is arranged to be secured between a users finger and a users wrist.

4. A portable optical reader as claimed in claim 3 further comprising a control unit for powering, and data exchange with, the reader element, the control unit being arranged to be secured to the user's wrist.

5. A portable optical reader as claimed in claim 4 in which the control unit powers and exchanges data with the reader element via cable means.

6. A portable optical reader as claimed in claim 4 in which the control unit powers and exchanges data with the reader element via a communication line provided in the guide.

7. A portable optical reader as claimed in claim 1 in which the reader element guide comprises a track.

8. A portable optical reader as claimed in claim 7 in which the reader element is arranged to slide along the track.

9. A portable optical reader as claimed in claim 8 in which the reader element is mounted against a mounting face of the track and includes retaining elements extending partially around the opposing face of the track.

10. A portable optical reader as claimed in claim 7 in which the reader element is mounted on rollers on the track for rolling movement.

11. A portable optical reader as claimed in claim 1 wherein detent means are provided on the reader element and cooperating detent means are located at one or more positions along the guide for releasably retaining the reader element at said one or more positions.

12. A portable optical reader as claimed in claim 1 in which the reader and guide are arranged to be supported on a garment for a user.

13. A portable optical reader as claimed in claim 12 in which the garment is a hat.

14. A portable optical reader as claimed in claim 12 in which the reader element guide is arranged to be supported in the chest region of the garment.

15. A portable optical reader comprising a reader element and a reader element guide arranged to be mounted on the hand of a user extending substantially from the finger to the wrist, the reader element being mounted on the guide and movable thereon long.

16. A portable optical reader as claimed in claim 15 further comprising a control unit mounted at the user's wrist and arranged to communicate with the reader element to power the reader element and for data exchange.

17. A portable optical reader as claimed in claim 15 in which the reader element is arranged to slip along the guide on contact with an external obstacle.

* * * * *